Figure 1:
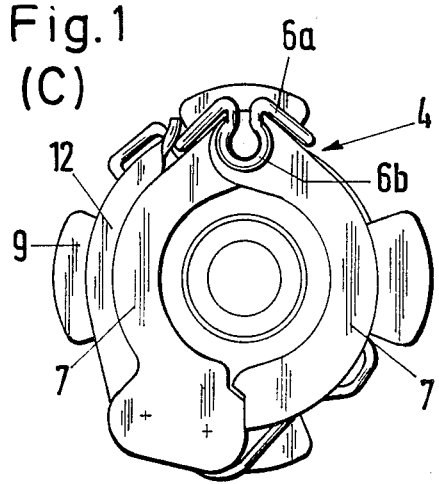

United States Patent [19]

Weinhold

[11] Patent Number: 4,872,711
[45] Date of Patent: Oct. 10, 1989

[54] DEVICE FOR CONNECTING A HOSE END TO A CONNECTING SPIGOT

[76] Inventor: Karl Weinhold, Im Jagdfeld 43,, D-4040 Neuss 1, Fed. Rep. of Germany

[21] Appl. No.: 219,471

[22] Filed: Jul. 14, 1988

[30] Foreign Application Priority Data

Jul. 28, 1987 [DE] Fed. Rep. of Germany ....... 3724886

[51] Int. Cl.$^4$ .............................................. F16L 33/12
[52] U.S. Cl. ........................................ 285/88; 285/71; 285/252
[58] Field of Search ....................... 285/71, 72, 76, 79, 285/87, 88, 114, 320, 252

[56] References Cited

FOREIGN PATENT DOCUMENTS 241568 3/1960 Australia ................................ 285/87
1400468 10/1968 Fed. Rep. of Germany .
3721063 5/1988 Fed. Rep. of Germany .

*Primary Examiner*—David A. Scherbel
*Assistant Examiner*—Jerrold D. Johnson
*Attorney, Agent, or Firm*—Michael J. Striker

[57] ABSTRACT

In an apparatus for connecting a hose end to a connecting spigot in the form of one half of a dog clutch on which a hose socket is formed, on to which the hose end is slipped and clamped, and which is enclosed by a clamp formed by at least two part shells and has a tension lever closure whose tension lever is hinged to a part shell and whose spring connects the tension lever releasably to the other part shell, the device having formed on the connecting spigot an annular collar engaged over by retaining flanges on one side of the part shells, while the clamping flanges forcing the hose against the socket are provided on the other side of the part shells, the retaining flanges being of dimensions such that the clamp is prevented from being pulled off axially of the socket even when the tension lever closure is opened, the clamp having a pivot pin with a shank, the dog clutch having clutch halves provides with cams, a U-shaped bent wire member which non-rotatably connects the clamp to the connecting spigot, the U-shaped bent wire member having a web bent to form an eyelet which positively engages around the shank of a pivot pin of the clamp, the U-shaped bent wire member having arms which enclose a cam of the dog clutch half.

3 Claims, 3 Drawing Sheets (A-B)

DEVICE FOR CONNECTING A HOSE END TO A CONNECTING SPIGOT

The invention relates to a device for connecting a hose end to a connecting member in the form of one half of a dog clutch on which a hose socket is formed which is enclosed by a clamp. The clamp comprises at least two part shells and has a tension lever closure whose tension lever is hinged to one part shell and whose spring releasably connects the tension lever to the other part shell. Disposed on the connecting spigot is an annular collar engaged over by the retaining flanges on one side of the part shells, while the clamping flanges forcing the hose against the socket are disposed on the other side of the part shells. The retaining flanges are so dimensioned that the clamp is prevented from being pulled off axially of the socket even when the tension lever is opened. Means are also provided for retaining the clamp non-rotatably on the connecting spigot.

The main features of a device of the kind specified is known from German Patent Specification No. 34 17 924 and completed by German Patent Specification No. 37 21 063 by means for disposing the clamp non-rotatably in the peripheral direction on the connecting member. The device disclosed by German Pat. No. 1 400 468 also provides such means, but they are of a very expensive construction.

It is an object of the invention to use simpler means than those of the prior art to dispose a clamp substantially non-rotatably on a connecting member in the form of one half of a dog clutch.

To this end, in an apparatus having the features set forth in the preamble of the claim, according to the invention the clamp is non-rotatably connected to the connecting member via a U-shaped bent wire member in whose web an eyelet is bent engaging positively around the shank of the pivot pin of the clamp and whose arms positively and/or non-positively enclose a cam of the dog clutch half forming the connecting member. The ends of the bent wire member arms bearing against the opposite sides of the cam of the dog clutch prevent the clamp from rotating peripherally of the connecting member. At the same time the bent wire member is simply shaped and cheap to produce and can be very simply and rapidly mounted.

According to a preferred feature of the device according to the invention the end of one of the two arms of the U-shaped bent wire member is bent radially at an inclination upwards and outwards. When the two dog clutch halves are brought together, the upwardly bent end of the arm then bends upwards and snaps back into the starting position when the two dog clutch halves have been rotated in relation to one another to reach the closure position.

It is made difficult for the dog clutch to open accidentally if according to a further preferred feature of the device according to the invention the upwardly bent end of the arm of the wire bent member is bent into a U-shaped portion extending peripherally of the connecting member over more than half the distance between two cams of the dog clutch half. It is true that the dog clutch can then easily be closed in the aforedescribed manner, but not readily automatically released, since the U-shaped wire member prevents the dog clutch halves from moving out of the closure position. If the two dog clutch halves are accidentally rotated in relation to one another, one of them abuts the U-shaped bent end of the bent wire member arm and from then onwards can be rotated further only if the U-shaped member is deliberately bent upwards manually. This provides an additional security against accidental opening of the dog clutch.

Figure 2:
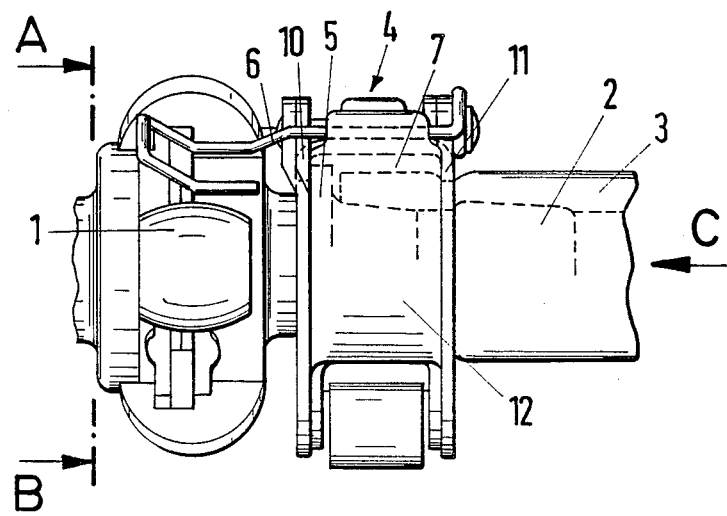
Figure 3:
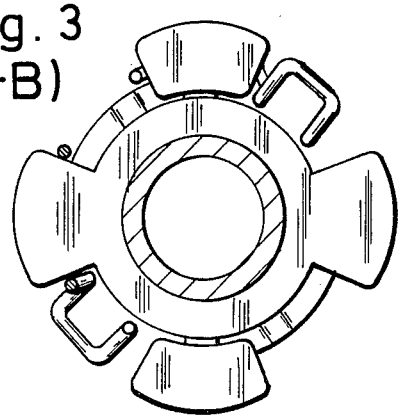
Figure 4:
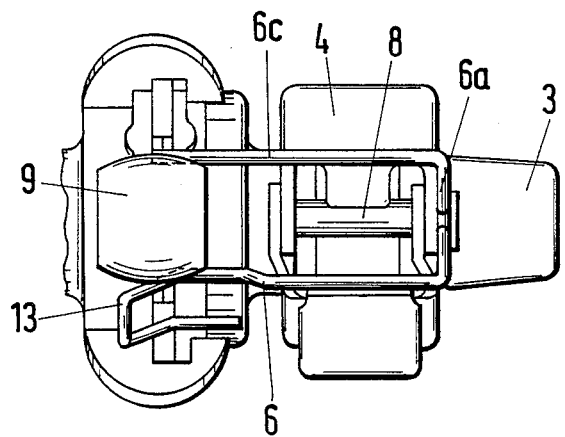
Figure 5:
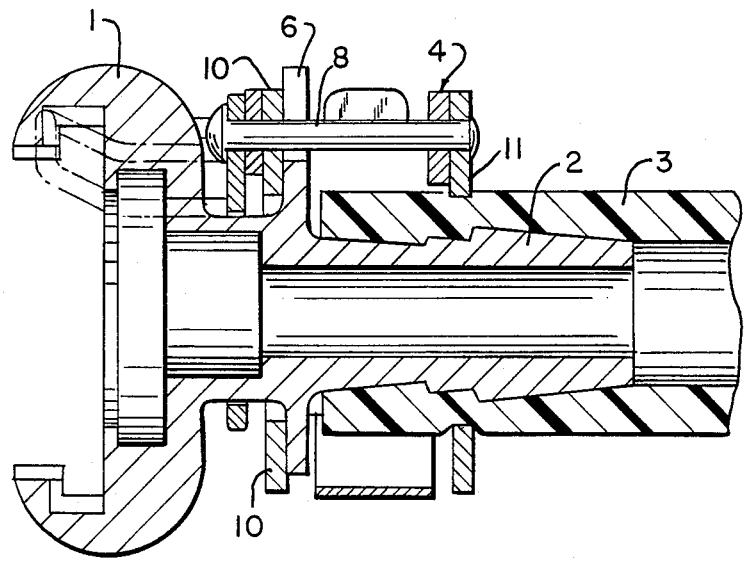

The invention will be described in greater detail with reference to the drawings, wherein:

FIG. 1 is a front elevation of the device,
FIG. 2 is a side elevation
FIG. 3 is a section, taken along the line A-B in FIG. 2,
FIG. 4 is a plan view, and
FIG. 5 is a cross-section of the device shown in FIG. 4.

In the embodiment illustrated a connecting spigot 1 takes the form of one half of a dog clutch. Formed in the axial direction on the connecting spigot 1 is a socket 2 on to which a hose end 3 is slipped and on which it is clamped by a clamp 4.

An annular collar 5 on the socket 2 prevents the clamp 4 from moving axially of the socket 2. For this purpose use is made of retaining flanges 10 engaging over the annular collar 5 on part shells of the clamp 4, opposite which clamping flanges 11 are disposed on the part shells on the other side. The retaining flanges 10 are so dimensioned that they do not extend beyond the annular collar 5, even when the tension lever closure is opened.

The axial mobility of the clamp 4 on the socket 2 is limited either by the distance of the annular collar 5 from the connecting spigot 1 or by the distance of the retaining flanges 10 from the clamping flanges 11, whichever is the smaller.

Extending between the connecting member 1 and the clamp 4 is a U-shaped bent wire member 6 which connects the two members to one another. In the zone of its web 6a the bent wire member 6 is bent into an eyelet 6b which engages around the shank of the pivot pin 8 of the clamp 4 and is thereby rigidly connected to the clamp 4. The arms 6b of the bent wire member 6 extend parallel with one another at a distance such that they bear against one dog clutch half forming the closure member 1 at opposite narrow places of the cam 9, as shown most clearly in FIG. 4. In this way the clamp 4 is prevented from rotating peripherally of the socket 3.

One end of the arm 6c of the bent wire member 6 is shaped into a U-shaped member 13 which, as shown most clearly in FIG. 2, is bent upwards to facilitate the coupling of the other dog clutch half. FIG. 2 shows the dog clutch in the closure position. The U-shaped member 13 extending between adjacent cams 1 prevents the clutch from opening automatically. For uncoupling, the clutch halves are rotated by one graduation in relation to one another only when the U-shaped member 13 has been deliberately bent upwards manually.

FIG. 3 shows two bent wire members 6, it being assumed that a clamp 4 is provided on each side of the dog clutch, each clamp being connected via the bent wire member 6 to one of the two dog clutch halves.

Since the cams 9 of the dog clutch are slightly conical, as shown most clearly by FIG. 3, the arms 6c of the bent wire member 6 bear against the narrowed portion of the cam 9, thus ensuring a certain stability of the overall construction even in the uncoupled condition.

I claim:

1. In an apparatus for connecting a hose end to a connecting spigot in the form of one half of a dog clutch on which a hose socket is formed, on to which the hose end is slipped and clamped, and which is enclosed by a clamp formed by at least two part shells and has a tension lever closure whose tension lever is hinged to a part shell and whose spring connects the tension lever releasably to the other part shell, the device having formed on the connecting spigot an annular collar engaged over by retaining flanges on one side of the part shells, while the clamping flanges forcing those hose against the socket are provided on the other side of the part shells, the retaining flanges being of dimensions such that the clamp is prevented from being pulled off axially of the socket even when the tension lever closure is opened, the clamp having a pivot pin with a shank, the dog clutch having clutch halves provides with cams, the improvement comprising:

a U-shaped bent wire member (6) which non-rotatably connects the clamp (4) to the connecting spigot (1), the U-shaped bent wire member (6) having a web (6a) bent to form an eyelet (6b) which positively engages around the shank of the pivot pin (8) of the clamp (4), the U-shaped bent wire member having arms (6c) which enclose one of said said cams of said dog clutch half.

2. An apparatus according to claim 1, wherein one of said arms (6c) of the said U-shaped bent wire member (6) has an end which is bent radially at an inclination upwards and outwards.

3. An apparatus according to claim 2, wherein said upwardly bent end of the arm (6c) of the wire bent member (6) is bent into a U-shaped portion extending peripherally of the connecting spigot (1) over more than half a distance between two of said cams (9) of the dog clutch half.

* * * * *